UNITED STATES PATENT OFFICE.

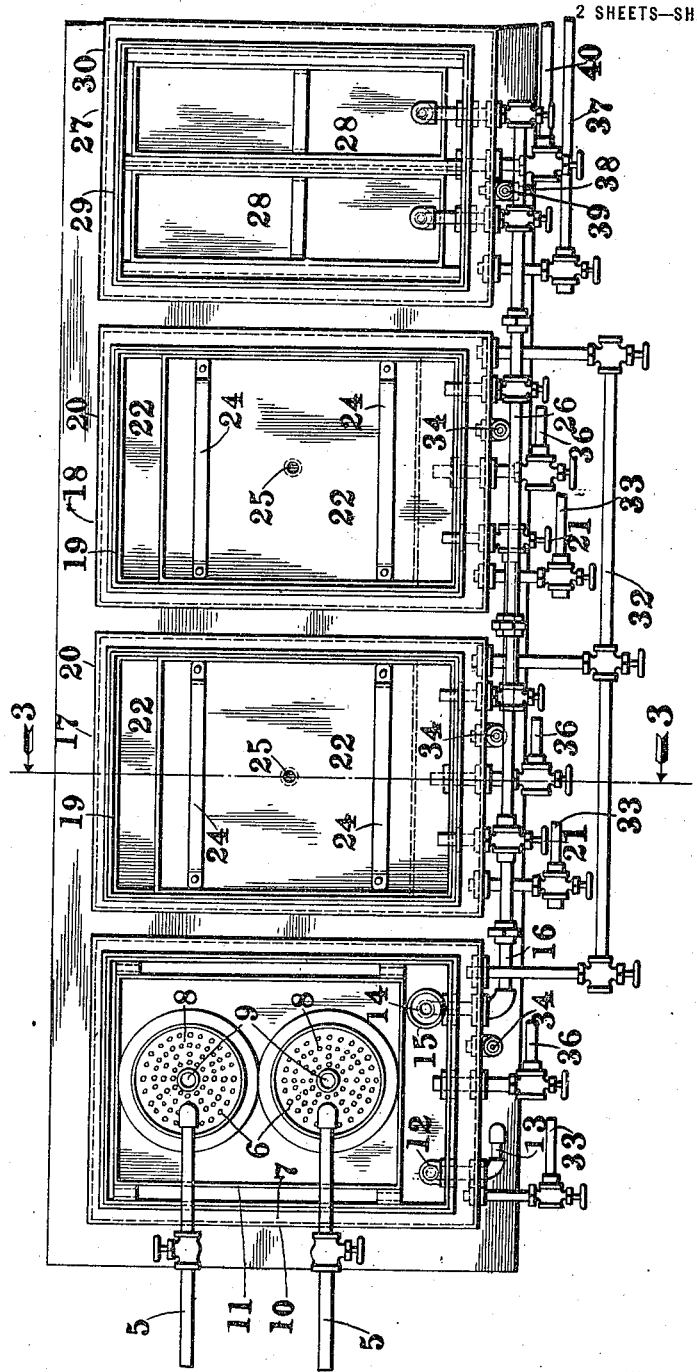

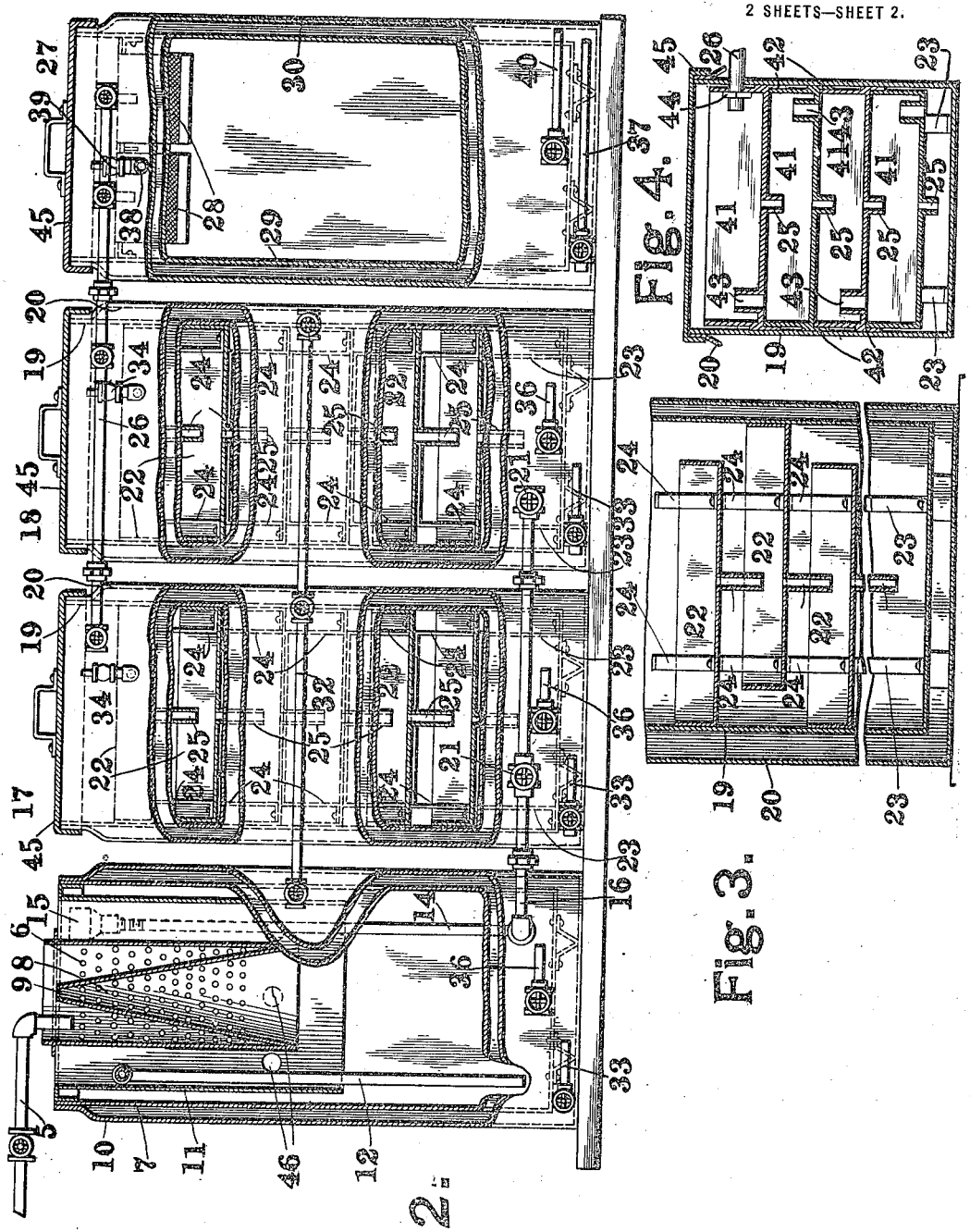

AUGUST H. FRANKE, OF ST. LOUIS, MISSOURI.

APPARATUS FOR PURIFYING OIL.

1,142,512.  Specification of Letters Patent.  Patented June 8, 1915.

Application filed August 1, 1912. Serial No. 712,759.

*To all whom it may concern:*

Be it known that I, AUGUST H. FRANKE, a citizen of the United States of America, residing at the city of St. Louis and State of Missouri, have invented a certain new and useful Apparatus for Purifying Oil, of which the following is such a full, clear, and exact description as will enable any one skilled in the art to which it appertains to make and use the same, reference being had to the accompanying drawings, forming part of this specification.

My invention relates to an apparatus for purifying oil and is especially adapted to use in connection with the lubricating systems of plants or factories.

The principle of my apparatus is based upon a discovery which I had made that if dirty oil is placed in a vessel provided with means for applying heat thereto, and the vessel is provided with a plurality of horizontal partitions forming precipitating surfaces, the dirt contained in the oil will be precipitated on said surfaces as the heating of the oil is carried forward to the proper degree. In practice, I apply the heat to the vessel containing the oil by surrounding the said vessel by a second vessel so as to form a heating chamber between the two, and I so arrange the partitions forming the precipitating surfaces that the oil may be forced continuously through the vessel and successively over the various precipitating surfaces.

In the accompanying drawings, which illustrate an apparatus made in accordance with my invention, Figure 1 is a top plan view; Fig. 2 is a side view of the complete apparatus partly in section and partly in elevation; Fig. 3 is a sectional view on the line 3—3 of Fig. 1; and Fig. 4 is a sectional view showing a slight modification.

Like marks of reference refer to similar parts in the several views of the drawings.

The oil to be conveyed to the apparatus is carried thereto by means of a pipe 5. This pipe 5 discharges the oil into a strainer 6 carried in a reservoir 7. This strainer 6 is provided with an inner conical portion 8 which terminates somewhat below the outer portion and has an opening 9 at its upper end so as to provide a safety outlet for the oil in case of the clogging of the strainer. The reservoir 7 is contained in an outer vessel 10 so as to form a heating chamber between the sides of the two vessels and this chamber also surrounds the bottom of the vessel 10 so as to thoroughly heat the contents of the same when heating fluid is admitted between the two vessels as hereinafter described. Surrounding the strainer 8 and projecting down a considerable distance into the vessel 7 is a shield 11. This shield causes the oil to come into intimate contact with the walls of the vessel 7 as it flows through the said vessel. In order to allow for the discharge of any water which may accumulate in the bottom of the vessel 7, I provide an upright pipe 12 which extends to a point near the bottom of the said vessel and has its end 13 projecting out through the side of the vessel, as best shown in Fig. 1.

In order to discharge the oil from the vessel 7, I provide a pipe 14 having its upper portion 15 adjustable and having its lower end 16 projecting through the walls of the vessels 7 and 10, and passing adjacent to the two purifying vessels 17 and 18 respectively. These two purifying vessels 17 and 18 are exactly alike in construction and two are used so that one may be employed while the other is being cleaned, or for any other reason cannot be used. Each of the vessels 17 and 18 is composed of an inner vessel 19 and an outer vessel 20, so as to form a heating chamber between the two vessels completely surrounding the inner vessels as has been described in connection with the reservoir 7. The oil is admitted from the pipe 16 to the vessels 17 and 18 by means of valves 21. Within each of the vessels 17 and 18, I place a number of pans 22 which form the precipitating surfaces for receiving the dirt which is precipitated from the oil. The lower of these pans 22 rests upon supports 23 carried on the bottom of the inner vessel 19. Each of the pans carries a pair of handles 24 which supports the next succeeding pan. The pans are somewhat shorter than the width of the vessel 19 and are ranged at alternate sides of the vessel, as shown in Fig. 3, so as to form a tortuous passage and thus to cause the oil, in passing through the vessel, to successively pass over each of the pans 22.

In order to allow any water which may be contained in the oil to pass down to the bottom of the vessel 19, I provide each of the pans 22 with a drain pipe 25, which drain pipes are preferably arranged in alinement, as clearly shown in the drawings. The oil, after passing over the various pans 22 and reaching the top of the chambers 17 and 18, is carried, by means of a discharge pipe 26, to the storage chamber 27. This storage chamber 27 is provided with strainers 28 which receive the oil from the pipe 26. The storage chamber 27 is formed of an inner vessel 29 and an outer vessel 30 so as to form a chamber between the two vessels completely surrounding the inner vessel. This chamber, however, is used as a cooling chamber, the space being supplied with a suitable cooling fluid as will be hereinafter more fully described.

Each of the vessels 17 and 18, as well as the reservoir 7, is provided with an inlet pipe 32 which is adapted to supply steam, or other suitable heating fluid to the space between the double vessels. Each of these vessels is likewise provided with a discharge or drain pipe 33 for draining off the water of condensation. The heating chambers are likewise each provided with a relief valve 34 which will relieve the pressure in case it becomes too great. The interiors of these vessels are also provided, in addition to the inlet and discharge pipes hereinbefore referred to, with drain pipes 36 which are adapted to drain off the water or dirty oil from the bottoms of the various receptacles. The cooling vessel 27 is provided with an inlet pipe 37 for the admission of cool water or other cooling fluid and an outlet pipe 38 which is also preferably provided with a relief valve 39. The oil from the interior of the vessel 27 is carried off by the discharge pipe 40.

In Fig. 4, I have shown a slight modification in which the pans 22 are replaced by pans 41 which are placed one on top of the other, each pan exactly covering the succeeding pan and being provided with a downwardly extending flange 42 so as to make a tight joint between the pans. These pans 41 are provided with central drain pipe 25. Each of the pans 41 is also provided with an opening 43, the openings in each successive pan being at alternate ends so that the oil, as it passes through these openings 43, will be compelled to pass in a tortuous manner over the precipitating surfaces provided by the bottoms of the pans 41. In this construction, the discharge pipe 26, in place of merely projecting into the interior of the vessel 19, will pass through the wall of the upper pan 41, as shown in Fig. 4. The pipe is preferably provided with a lock-nut 44 for forming a tight joint between the pan and the pipe. Each of the vessels 17 and 18, as well as the storage chamber 27 may be provided with a removable cover 45. These covers, however, should not be so tight as to prevent the escape of any volatile gas which may pass off from the oil during the process of heating.

The operation of my apparatus, briefly stated, is as follows: The oil is delivered to one or more of the strainers 6 through the pipes 5. After passing through the strainers 6 where the coarser impurities are removed, the oil passes down on the inside and upwardly on the outside of the shield 11 and is thus brought into intimate contact with the heated sides of the chamber 7, thus heating the oil so as to cause it to deposit its heaviest impurities and the major portion of the water which it contains. The water collects in the bottom of the reservoir 7 and is automatically discharged through the water discharge pipe 12. The oil discharge pipe 15 is made adjustable in height so as to regulate the water discharge for oils of varying density. The shield 11 is provided with openings 46 intermediate its length so that the oil may pass through the shield in case an abnormal quantity of water collects in its reservoir, thus preventing the water-sealing of the shield. The oil, after passing down through the pipe 15, is conveyed by the pipe 16 to one of the chambers 17 or 18. It is to be noted that the pipe 16 enters this chamber at a sufficient distance from its bottom to prevent the oil from passing through the accumulated impurities in the bottom of this chamber. The oil now passes up through the separating chambers and successively over each of the precipitating surfaces formed by the bottoms of the pans therein. As the oil passes upward, it becomes lighter and lighter owing to the heat imparted to it from the heating chamber and consequently lighter and lighter impurities are precipitated on the precipitating surfaces until when the top of the chamber is reached all of the impurities will be precipitated except those which are lighter than the oil and which are fine enough to pass through the initial strainer 6. These light and fine impurities are separated from the oil by means of the fine strainers 28 when the oil is conveyed from the separating chamber to the storage chamber 27 through the pipe 26. The oil which accumulates in the storage chamber 27 is cooled by means of the cool liquid passing through its cooling chamber and is now ready to draw off through the pipe 40 and is ready for immediate use.

The impurities from the bottoms of the chambers 7, 17 and 18 may be drawn off by means of the drain pipes 36. When, however, it is necessary to thoroughly clean one of the chambers 17 or 18, the flow of oil is diverted into the other chamber and the various pans 22 are removed. It will be evident that these pans are readily removed as each is separated from the next successive pan. The water of condensation may be drawn off from the heating chambers of the vessels 7, 17 and 18 by means of the drain pipes 33.

In the modification shown in Fig. 4, the pans may be removed in the same manner as above described except that it will be first necessary to detach the outlet pipe 26.

Having fully described my invention, what I claim as new and desire to secure by Letters Patent of the United States is:

In an oil purifier, the combination with a vessel adapted to contain oil, of means for heating said vessel, and a plurality of removable pans, the bottoms of which form precipitating surfaces, each of said pans being supported from the next lower pan, said pans being provided with centrally located, downwardly projecting drain pipes and with alternately arranged openings for the passage of the oil, said openings being provided with upwardly projecting flanges, said pans being provided with depending flanges forming slip joints.

In testimony whereof, I have hereunto set my hand and affixed my seal in the presence of the two subscribing witnesses.

AUGUST H. FRANKE. [L. S.]

Witnesses:
W. A. ALEXANDER,
G. M. SHORE.